J. S. GENDALL.
SAFETY SWIVEL FOR CABLES.
APPLICATION FILED NOV. 13, 1920.
1,404,197.
Patented Jan. 24, 1922.
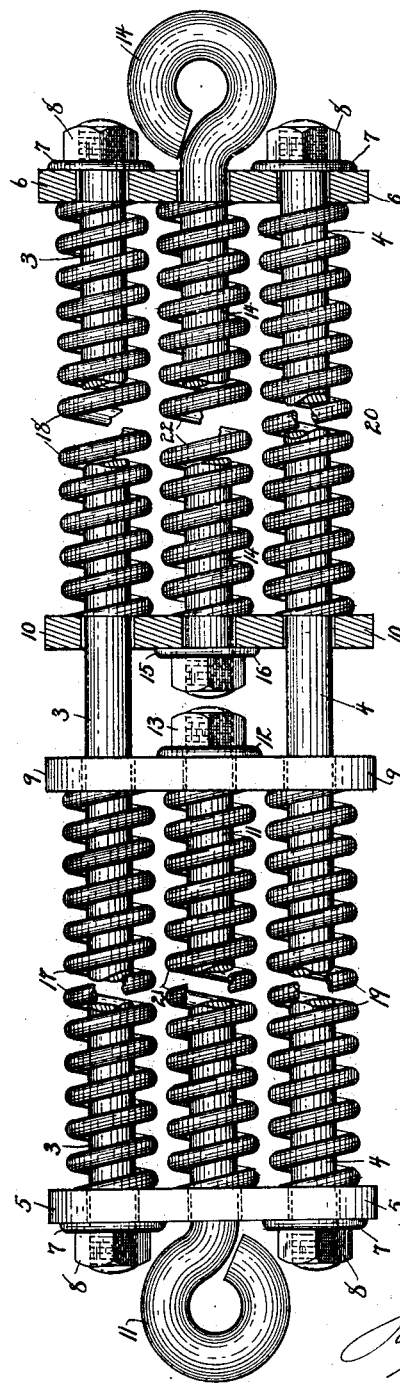

UNITED STATES PATENT OFFICE.

JOHN S. GENDALL, OF WOODMONT, CONNECTICUT.

SAFETY SWIVEL FOR CABLES.

1,404,197.　　　　Specification of Letters Patent.　　Patented Jan. 24, 1922.

Application filed November 13, 1920. Serial No. 423,943.

*To all whom it may concern:*

Be it known that I, JOHN S. GENDALL, a citizen of the United States, residing at Woodmont, in the county of New Haven and State of Connecticut, have invented a new and useful Improvement in Safety Swivels for Cables; and I do hereby declare the following, when taken in connection with the accompanying drawings and the characters of reference marked thereon, to be a full, clear, and exact description of the same, and which said drawings constitute part of this application, and represents a plan view, partly in sections, of a safety swivel for cables, constructed in accordance with my invention.

This invention relates to improvement in safety swivel for cables particularly adapted for use in connection with tow-lines, hawsers or life lines to disabled vessels. The object of the invention is to provide a swivel connection for a cable or other line which will prevent the cable or line from breaking when subjected to sudden strain and the invention consists in the construction and arrangement of parts as hereinafter described and particularly recited in the claim. In carrying out my invention I employ two stay rods 3 and 4 over which are passed end plates 5 and 6 which have a bearing against washers 7 held in place by nuts 8 applied to the ends of the stay rods 3 and 4. Between the plates 5 and 6 are slide-plates 9 and 10 free to move upon the stay rods and extending through end plate 5 is an eye bolt 11, the inner end of which extends through the slide-plate 9 and has a washer 12 and a nut 13 applied to its end. Extending through the end plate 6 is a similar eye bolt 14 which projects through the slide plate 10 and has applied to its inner end a washer 15 and a nut 16. Around the stay rod 3 between the end plate 5 and slide plate 9 is a coil spring 17 and between the end plate 6 and slide plate 10 is a coil spring 18 and on the stay rod 4 are similar springs 19 and 20. Around the eye bolt 11 between the plates 5 and 9 is a spring 21 and upon the eye bolt 14 between the plates 6 and 10 is a spring 22. Preferably when assembled the ends of the stay rod and the ends of the eye bolts will be upset over their respective nuts so as to be firmly interlocked therewith.

This device is connected with a tow-line, hawser or other cable and so that strain upon the eye bolts will compress the springs by drawing the slide plate 9 toward the end plate 5 and the slide plate 10 toward the end plate 6, thus relieving the strain on the main line keeping the line taut and preventing the line from breaking when sudden strains are applied thereto as in the case of towing in rough water or in the case of a life line to a disabled vessel which is rocking. The eye bolts are free to turn so that the device acts as a swivel and thereby further relieves the strain upon the line.

If desired two or more of these devices may be connected with the same line thus increasing the amount of strain the line will bear. The size of springs will be determined by the purpose for which the device is to be used.

I claim:

A safety swivel for cables comprising two stay rods, end plates mounted at the respective ends of said rods, two slide plates on said stay rods between the end plate, eye-bolts extending through the end plates in which they may turn and having a turning bearing on the adjacent slide-plates and springs surrounding the stay-rods between the end plates and slide-plates and around the respective eye bolts.

In testimony whereof, I have signed this specification in the presence of two subscribing witnesses.

JOHN S. GENDALL.

Witnesses:
MALCOLM P. NICHOLS,
MILDRED E. HOWE.